United States Patent [19]

Susak et al.

[11] Patent Number: 5,329,585
[45] Date of Patent: Jul. 12, 1994

[54] SUBSCRIBER LINE INTERFACE CIRCUIT FOR CONTROLLING AC AND DC OUTPUT IMPEDANCE

[75] Inventors: David M. Susak; Tony Takeshian, both of Chandler; Dennis L. Welty, Mesa, all of Ariz.

[73] Assignee: Motorola, Inc., Schaumburg, Ill.

[21] Appl. No.: 983,197

[22] Filed: Nov. 30, 1992

[51] Int. Cl.[5] .................... H04M 1/76; H04M 7/04
[52] U.S. Cl. .............................. 379/399; 379/403; 379/404; 379/413
[58] Field of Search ............ 379/399, 400, 401, 402, 379/405, 413, 404

[56] References Cited

U.S. PATENT DOCUMENTS

| | | |
|---|---|---|
| 4,476,350 | 10/1984 | Aull et al. |
| 4,514,595 | 4/1985 | Rosenbaum et al. ......... 379/385 |
| 4,571,460 | 2/1986 | Rosenbaum et al. ......... 379/412 |
| 4,588,860 | 5/1986 | Ayano et al. ................. 379/405 |
| 4,612,417 | 9/1986 | Toumani ...................... 379/413 |
| 4,661,978 | 4/1987 | Hirata .......................... 379/399 |
| 4,677,667 | 6/1987 | Burns .......................... 379/400 |
| 4,727,574 | 2/1988 | Jakab ........................... 379/413 |
| 4,760,595 | 7/1988 | Arai ............................. 379/405 |
| 4,764,956 | 8/1988 | Rosch et al. ................. 379/413 |
| 4,803,721 | 2/1989 | Schingh ....................... 379/399 |
| 4,866,768 | 9/1989 | Sinberg ........................ 379/399 |
| 4,899,382 | 2/1990 | Gartner ........................ 379/413 |

Primary Examiner—James L. Dwyer
Assistant Examiner—Scott L. Weaver
Attorney, Agent, or Firm—Robert D. Atkins

[57] ABSTRACT

A subscriber line interface circuit (SLIC) sets AC and DC output impedances as seen by first and second transmission signals. The common mode variation and differential variation of the first and second transmission signals is AC-sensed to provide a common mode feedback signal and a differential feedback signal which in turn controls the AC output impedance. The DC component of the first and second transmission signals is blocked allowing downstream amplifiers to operate at reduced power supply potentials. The DC variation of the first and second transmission signals is also sensed for providing a DC feedback signal to control the DC output impedance.

10 Claims, 1 Drawing Sheet

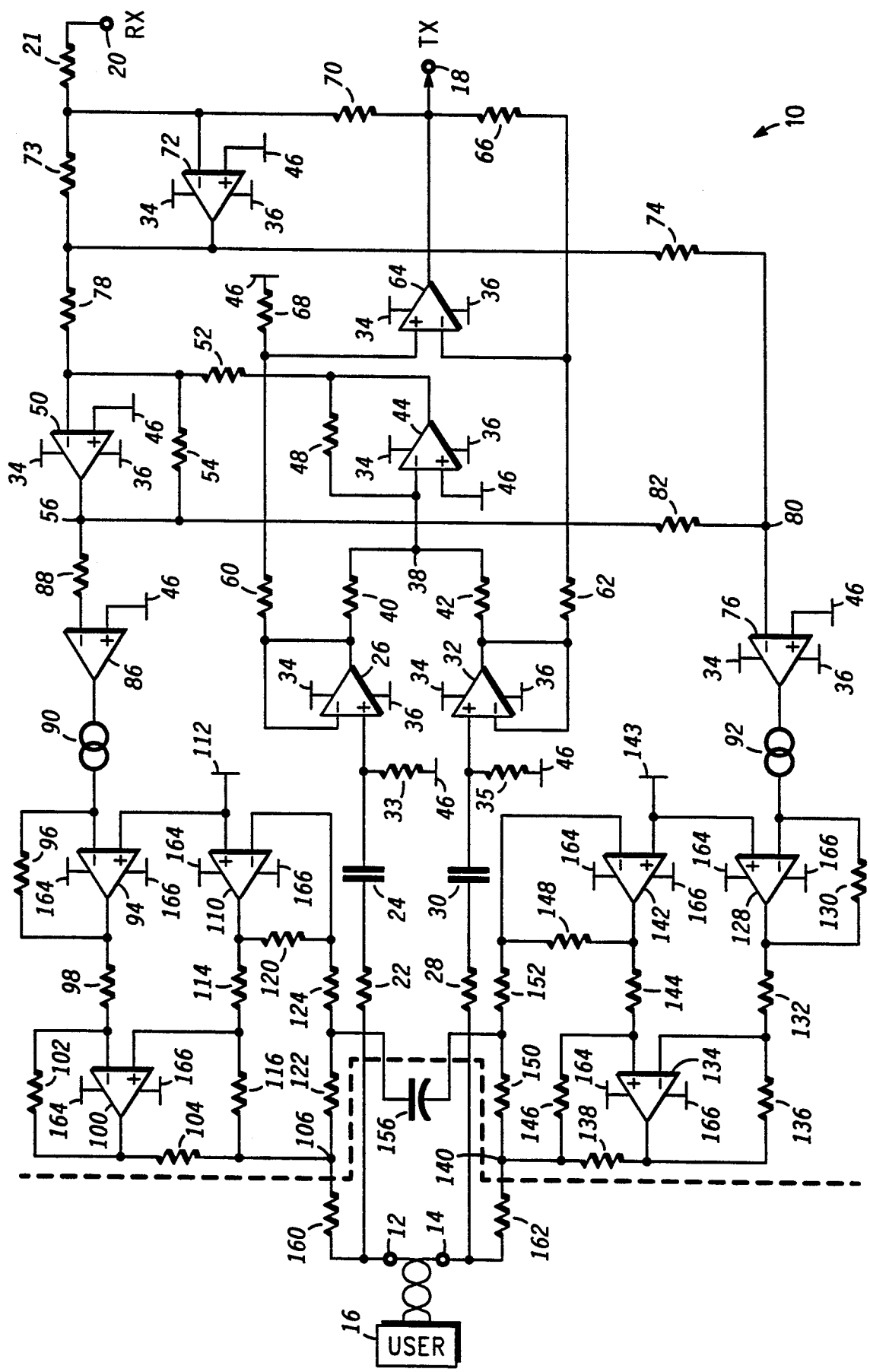

SUBSCRIBER LINE INTERFACE CIRCUIT FOR CONTROLLING AC AND DC OUTPUT IMPEDANCE

BACKGROUND OF THE INVENTION

The present invention relates to subscriber line interface circuits, and more particularly, to a subscriber line interface circuit for controlling AC and DC output impedance.

Telephone communication systems use a subscriber line interface circuit (SLIC) at the central office to interface each phone user to the telephone network. For example, a residential phone site is connected to the central office by a communication loop comprising two transmission lines, commonly referred to as TIP and RING, nominally energized to 48 volts DC with an AC signal modulated for the voice data. The TIP and RING lines come in a twisted-pair configuration from the residential phone and are eventually coupled to one SLIC at the central office. The other side of the SLIC board provides a TX signal and receives an RX signal from other SLIC boards. Thus, a complete telephone communication originates from one party, travels over first TIP and RING lines, and is processed through a first SLIC and out as a TX signal to the RX input of a second SLIC for transmission over second TIP and RING lines to the receiving party.

The SLIC provides a predetermined AC and DC termination impedance for the TIP and RING lines at the central office. In a DC sense, the TIP and RING lines are matched each side to 200 ohms±10% looking into the central office. The DC termination limits DC current flowing through TIP and RING. In an AC sense, the TIP and RING lines each see 100–800 ohms ±0.1% common mode and 300–450 ohms ±0.1% differential depending on the telephone system. A proper AC termination is needed to suppress common mode voltage spikes, e.g., from inductive pick-up when TIP and RING are placed near 110 VAC residential power wires.

A common design approach for the SLIC, as described in U.S. Pat. No. 4,476,350, is to use operational amplifiers (op amps) because of their bi-directional properties. One problem with known SLIC designs is that the op amps are DC-wired to TIP and RING. That is, the 48 VDC signal level on TIP and RING follows DC paths through resistors and appears at the inputs of the op amps. Hence, the op amps must operate with at least 48 VDC power supply potential.

Unfortunately, op amps running off a 48 VDC power supply tend to consume more power than ones operating at a lower power supply potential. With the large number of telephone users connected to the central office, each requiring a dedicated SLIC, power dissipation becomes significant. Although the SLIC may be idle the vast majority of the time when the phone is on-hook, it still must be biased ready to transmit large amounts of power, on the order of 400 milliwatts, when the call comes through and the phone is pulled off-hook for voice communications. At 48 VDC operating potential, each SLIC may dissipate upwards of 90 milliwatts between calls. Moreover, with the introduction of telemetering and caller-ID, SLICs must pass AC signals while the phone is on-hook. Thus, power requirements are increasing even during times the phone is on-hook. Any reduction in power consumption by operating one or more op amps in the SLIC at a lower power supply potential translates to a considerable power savings.

Hence, a need exists for a SLIC operating one or more of its op amps at a reduced power supply potential to reduce overall power consumption.

BRIEF DESCRIPTION OF THE DRAWING

The sole FIGURE is a schematic and block diagram illustrating a subscriber line interface circuit.

DETAILED DESCRIPTION OF THE PREFERRED EMBODIMENT a SLIC 10 is shown in the sole FIGURE receiving TIP and RING twisted-wire transmission lines 12 and 14 from telephone user 16. SLIC 10 exchanges voice data signals with the telephone switching equipment (not shown) in the central telephone office via terminals 18 and 20, while sending and receiving telephone signals modulated on 48 VDC over TIP and RING lines 12 and 14 with user 16. For example, user 16 may transmit telephone signals through TIP and RING lines 12 and 14 to SLIC 10 where the voice information is extracted and passed as a TX signal via terminal 18 to the telephone switching equipment. The communication signals are routed to a second SLIC in the central telephone office corresponding to a second user where the corresponding RX signal is received at terminal 20 of the second SLIC for transmission as TIP and RING to the second end user.

SLIC 10 establishes predetermined AC and DC termination impedances for TIP and RING lines 12-14. In a DC sense, TIP and RING lines 12 and 14 are matched each side to 200 ohms ±10% looking into the central office. The DC termination limits DC current flowing through TIP and RING when user 16 telephone is off-hook. In an AC sense, TIP and RING lines 12-14 see 100–800 ohms ±0.1% common mode and 300–450 ohms ±0.1% differential depending on the telephone system. The AC termination suppresses common mode voltage spikes.

To sense AC common mode and differential signals, TIP line 12 is applied through resistor 22 and AC-coupled by capacitor 24 to the non-inverting input of amplifier 26. Likewise, RING line 14 is applied through resistor 28 and AC-coupled by capacitor 30 to the non-inverting input of amplifier 32. The outputs of amplifiers 26 and 32 are coupled to their respective inverting inputs as voltage followers. Resistors 33 and 35 are shunted to the non-inverting inputs of amplifiers 26 and 32, respectively.

By sensing TIP and RING in an AC fashion and blocking DC signals with capacitors 24 and 30, amplifiers 26 and 32 may operate with ±5 VDC on power supply conductors 34 and 36, respectively. This is a significant improvement over the prior art where amplifiers in the common mode and differential feedback paths are DC-coupled to TIP and RING transmission lines and therefore must be biased with a 48 VDC power supply to handle the DC signal levels. The power consumption of SLIC 10 is significantly reduced by operating amplifiers downstream from capacitors 24 and 30, e.g. amplifiers 26 and 32, at ±5 VDC.

Any common mode signal on TIP and RING also appears at node 38 at the interconnection of matched resistors 40 and 42. Node 38 is also the inverting input of amplifier 44. The non-inverting input of amplifier 44 is referenced to ground potential on power supply conductor 46. Resistor 48 is coupled between the output of amplifier 44 and its inverting input. The output signal of amplifier 44 is an inverted AC common mode feedback signal driving a summing node at the inverting input of amplifier 50 by way of resistor 52. The non-inverting input of amplifier 50 is referenced to ground potential on power supply conductor 46, while resistor 54 is coupled between the output of amplifier 50 and its inverting input. Amplifiers 44 and 50 operate off ±5 VDC from power supply conductors 34 and 36 and provide two inversions with gain of the AC common mode feedback signal from node 38 to node 56 at the output of amplifier 50.

A differential signal on TIP and RING has no effect at node 38 because of the balanced configuration. Instead, the outputs of amplifiers 26 and 32 provide differential feedback through resistors 60 and 62 to the non-inverting and inverting inputs of amplifier 64, respectively. Amplifier 64 also operates with ±5 VDC from power supply conductors 34 and 36. Resistor 66 is coupled between the output of amplifier 64 and its inverting input, while resistor 68 is coupled between the non-inverting input of amplifier 64 and ground potential. The output of amplifier 64 provides both the TX signal and an AC differential feedback signal through resistor 70 to the inverting input of amplifier 72. The inverting input of amplifier 72 also receives the RX signal by way of resistor 21. Resistor 73 is coupled between the output of amplifier 72 and its inverting input. The output of amplifier 72 provides an inverted AC differential feedback signal through resistor 74 to the inverting input of amplifier 76, and through resistor 78 to a summing junction at the inverting input of amplifier 50. The non-inverting inputs of amplifiers 72 and 76 are referenced to ground potential on power supply conductor 46. The inverting input of amplifier 76 at node 80 also receives the AC common mode feedback signal from node 56 by way of resistor 82 in phase with respect to node 38. Amplifiers 72 and 76 operate off ±5 VDC from power supply conductors 34 and 36.

Thus, amplifier 50 receives an inverted AC common mode feedback signal with respect to node 38 and provides an in-phase AC common mode feedback signal to nodes 56 and 80. Amplifier 50 also receives an inverted AC differential feedback signal with respect to terminal 18 and provides an in-phase AC differential feedback signal at node 56 for amplifier 86 via resistor 88. The AC common mode feedback signal is in-phase at nodes 56 and 80 but ultimately provides negative feedback common mode correction of the termination impedance of SLIC 10. Similarly, amplifier 72 receives an in-phase AC differential feedback signal and provides an inverted AC differential feedback signal at node 80. The AC differential feedback signals are of opposite phase and provide negative feedback to correct the termination impedance in differential manner.

Amplifiers 76 and 86 are transconductane generators driving into bi-directional current sources 90 and 92, respectively. The output of current source 90 is coupled to the inverting input of amplifier 94. Resistor 96 is coupled between the output of amplifier 94 and its inverting input, while resistor 98 is coupled between the output of amplifier 94 and the inverting input of amplifier 100. Resistor 102 is coupled between the output of amplifier 100 and its inverting input, while resistor 104 is coupled between the output of amplifier 100 and node 106. The non-inverting inputs of amplifiers 94 and 110 are coupled to power supply conductor 112 energized to −3 VDC to provide some operating range. The output of amplifier 110 is coupled through resistor 114 to the non-inverting input of amplifier 100 and further through resistor 116 to node 106. Resistor 120 is coupled between the output of amplifier 110 and its inverting input, while resistors 122 and 124 are coupled between node 106 and the inverting input of amplifier 110. The voltage developed at node 106 is fed back through resistors 122 and 124 for providing a DC feedback signal to the inverting input of amplifier 110. Thus, amplifiers 94, 100 and 110 form a first loop for controlling AC and DC impedances looking into the TIP input of SLIC 10.

In a similar manner, the output of current source 92 is coupled to the inverting input of amplifier 128. Resistor 130 is coupled between the output of amplifier 128 and its inverting input, while resistor 132 is coupled between the output of amplifier 128 and the inverting input of amplifier 134. Resistor 136 is coupled between the output of amplifier 134 and its inverting input, while resistor 138 is coupled between the output of amplifier 134 and node 140. The non-inverting inputs of amplifiers 128 and 142 are coupled to power supply conductor 143 operating at −45 VDC. The output of amplifier 142 is coupled through resistor 144 to the non-inverting input of amplifier 134 and further through resistor 146 to node 140. Resistor 148 is coupled between the output of amplifier 142 and its inverting input, while resistors 150 and 152 are coupled between node 140 and the inverting input of amplifier 142. External capacitor 156 is coupled between the interconnection of resistors 122–124 and resistors 150–152. The voltage developed at node 140 is fed back through resistors 150 and 152 for providing a DC feedback signal to the inverting input of amplifier 142. Thus, amplifiers 128, 134 and 142 form a second loop for controlling AC and DC impedances looking into the RING input of SLIC 10. The first and second loops are matched to within 10%.

In addition, amplifiers 94, 100, 110, 128, 134 and 142 operate between ground potential and −48 VDC from power supply conductors 164 and 166 since each is DC-coupled to TIP and RING transmission lines 12–14. External resistors 160 and 162 are 100 ohms, 10 watts each external to SLIC 10 for providing protection against voltage transients up to 2500 volts peak. The values of remaining components in SLIC 10 are given as follows:

TABLE 1

| Component | Value | Component | Value |
|---|---|---|---|
| Resistor 22 | 20K ohms | Resistor 28 | 20K ohms |
| Resistor 33 | 1M ohms | Resistor 35 | 1M ohms |
| Resistor 40 | 100K ohms | Resistor 42 | 100K ohms |
| Resistor 48 | 12.5K ohms | Resistor 52 | 45K ohms |
| Resistor 54 | 50K ohms | Resistor 60 | 50K ohms |
| Resistor 62 | 50K ohms | Resistor 66 | 25K ohms |
| Resistor 68 | 25K ohms | Resistor 70 | 41K ohms |
| Resistor 73 | 5K ohms | Resistor 74 | 50K ohms |
| Resistor 78 | 100K ohms | Resistor 82 | 50K ohms |
| Resistor 88 | 50K ohms | Resistor 96 | 20K ohms |
| Resistor 98 | 20K ohms | Resistor 102 | 50K ohms |
| Resistor 104 | 25 ohms | Resistor 114 | 20K ohms |
| Resistor 116 | 50K ohms | Resistor 120 | 20K ohms |
| Resistor 122 | 100K ohms | Resistor 124 | 100K ohms |
| Resistor 130 | 20K ohms | Resistor 132 | 20K ohms |
| Resistor 136 | 50K ohms | Resistor 138 | 25 ohms |
| Resistor 144 | 20K ohms | Resistor 146 | 50K ohms |
| Resistor 150 | 100K ohms | Resistor 152 | 100K ohms |
| Capacitor 24 | 0.1 uf | Capacitor 30 | 0.1 uf |
| Capacitor 156 | 2.0 uf | | |

The first and second loops exhibit very high AC output impedance without feedback. The AC common mode and differential feedback signals reduce the effective AC output impedance with negative feedback to achieve the desired termination by selecting proper resistor values as per Table 1. The AC output impedance seen at line 12 is the 100 ohms from resistor 160 plus the impedance looking into node 106 which is determined by the gain of amplifier 100. Capacitor 156 provides an AC path to a virtual ground at the interconnection of resistors 150-152 to shunt away any AC component of the TIP signal and removes amplifier 110 from the AC analysis.

Consider an increasing AC common mode signal at TIP and RING lines 12 and 14. Node 38 increases accordingly and the output of amplifier 44 goes down. Node 56 increases and the output of amplifier 86 decreases to pull current out of the inverting input of amplifier 94. The output of amplifier 94 goes up to dump current into inverting input of 100 and decrease the output signal level of amplifier 100. The voltage across resistor 104 decreases which proportionately reduces current flow into node 106. With the voltage and current decreasing in proportion to one another, the effective AC output impedance of SLIC 10 at TIP line 12 remains constant at its predetermined value. Conversely, a decreasing AC common mode signal at TIP and RING lines 12 and 14 causes node 38 to decrease while the output of amplifier 44 goes up. Node 56 decreases and the output of amplifier 86 increases to dump current into the inverting input of amplifier 94. The output of amplifier 94 goes down to pull current from inverting input of 100 and increase the output signal level of amplifier 100. The voltage across resistor 104 increases to proportionately increase current flow into node 106, again maintaining the predetermined AC impedance.

A similar result may be seen differentially where an increasing AC differential signal at TIP and RING lines 12 and 14 causes terminal 18 to increase. Node 56 increases accordingly and the output of amplifier 86 decreases to pull current out of the inverting input of amplifier 94. The output of amplifier 94 goes up to dump current into inverting input of 100 and decrease the output signal level of amplifier 100. The voltage across resistor 104 increases which proportionately increases current flow into node 106 and effectively maintains constant AC impedance.

A decreasing AC differential signal at TIP and RING lines 12 and 14 causes terminal 18 to decrease. Node 56 also decreases and the output of amplifier 86 increases to dump current into the inverting input of amplifier 94. The output of amplifier 94 goes down to pull current from inverting input of 100 and increase the output signal level of amplifier 100. The voltage across resistor 104 decreases to reduce the current flow into node 106, again maintaining the predetermined AC impedance.

The operation of amplifiers 128 and 134 follow a mirror image of the operation described for amplifier 94 and 100 because of their differential nature. The voltage and current at RING line 14 goes down with increasing AC signals and goes up with decreasing AC signals. The result is a regulated AC output impedance for TIP and RING lines 12 and 14 to compensate for common mode and differential variation.

Now consider the regulation of the DC impedance. Capacitors 24 and 30 block any DC signal from TIP and RING and thereby remove amplifiers 26, 32, 44, 50, 64, 72, 76, 86, 94 and 128 from the DC analysis. Resistors 98 and 114 are set equal and resistors 102 and 116 are set equal so that half of the voltage from node 106 appears at each of the non-inverting and inverting inputs of amplifier 100.

For the first loop, if the DC voltage at node 106 increases, the output of amplifier 110 goes down as the DC feedback signal to its inverting input increases. The current flowing into the non-inverting input of amplifier 100 decreases and the output of amplifier 100 goes down. A greater voltage develops across resistor 104 and more current flows into node 106 to regulate the DC impedance looking into node 106 at a constant predetermined level as determined by the components specified in Table 1. Alternately, if the DC voltage at node 106 decreases, the output of amplifier 110 goes up as the DC feedback signal to its inverting input decreases. The current flowing into the non-inverting input of amplifier 100 increases and the output of amplifier 100 goes up. A lesser voltage develops across resistor 104 and less current flows into node 106 to again regulate the DC impedance looking into node 106. The result is a regulated DC output impedance for TIP and RING lines 12 and 14 with negative feedback to compensate for DC variation.

For the second loop, if the DC voltage at node 140 increases, the output of amplifier 142 goes down as the DC feedback signal to its inverting input increases. The current flowing into the non-inverting input of amplifier 134 decreases and the output of amplifier 134 goes down. A greater voltage develops across resistor 138 and more current flows into node 140 to regulate the DC impedance looking into node 140 at a constant predetermined level. Alternately, if the DC voltage at node 140 decreases, the output of amplifier 142 goes up as the DC feedback signal to its inverting input decreases. The current flowing into the non-inverting input of amplifier 134 increases and the output of amplifier 134 goes up. A lesser voltage develops across resistor 138 and less current flows into node 140 to regulate the DC impedance looking into node 140. The result is a regulated DC output impedance for TIP and RING lines 12 and 14 with negative feedback to compensate for DC variation.

Hence, SLIC 10 sets AC and DC output impedances as seen by TIP and RING lines 12 and 14. The common mode variation and differential variation of TIP and RING is AC-sensed to provide a common mode feedback signal and a differential feedback signal which in turn controls the AC output impedance. The DC component of TIP and RING is blocked allowing downstream amplifiers to operate at reduced power supply potentials. The DC variation of TIP and RING is sensed for providing a DC feedback signal to control the DC output impedance.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A subscriber line interface circuit (SLIC) having first and second inputs, comprising:
   first means coupled to the first and second inputs of the SLIC for receiving first and second transmission signals having AC and DC signal levels, said first means sensing AC common mode variation and AC differential variation of said first and second transmission signals for providing a common mode feedback signal and a differential feedback signal, said first means including,
  (a) a first amplifier having first and second inputs and an output, said output being coupled to said first input of said first amplifier, said first amplifier receiving first and second power supply potentials less than said DC signal level on said first transmission signal,
  (b) a second amplifier having first and second inputs and an output, said output being coupled to said first input of said second amplifier, said second amplifier receiving said first and second power supply potentials less than said DC signal level on said second transmission signal,
  (c) a first resistor and a first capacitor serially coupled between the first input of the SLIC and said second input of said first amplifier,
  (d) a second resistor and a second capacitor serially coupled between the first input of the SLIC and said second input of said first amplifier,
  (e) a third resistor coupled between said output of said first amplifier and a first node, and
  (f) a fourth resistor coupled between said output of said second amplifier and said first node for providing said common mode feedback signal; and
second means coupled to the first and second inputs of the SLIC for providing an AC output impedance, said second means receiving said common mode feedback signal and said differential feedback signal for controlling said AC output impedance.

2. The SLIC of claim 1 wherein said first means further includes:
a third amplifier having first and second inputs and an output, said first input being coupled to said first node, said second input receiving a third power supply potential;
a fifth resistor coupled between said output of said third amplifier and said first input of said third amplifier;
a fourth amplifier having first and second inputs and an output, said first input being coupled to said output of said third amplifier, said second input receiving said third power supply potential, said output providing said common mode feedback signal; and
a sixth resistor coupled between said output of said fourth amplifier and said first input of said fourth amplifier.

3. The SLIC of claim 2 wherein said first means further includes:
a fifth amplifier having first and second inputs and an output, said first input being coupled to said output of said first amplifier, said second input being coupled to said output of said second amplifier;
a seventh resistor coupled between said output of said fifth amplifier and said second input of said fifth amplifier;
a sixth amplifier having first and second inputs and an output, said first input being coupled to said output of said fifth amplifier, said second input receiving said third power supply potential, said output being coupled to said first input of said fourth amplifier; and an eighth resistor coupled between said output of said sixth amplifier and said first input of said sixth amplifier.

4. The SLIC of claim 3 wherein said second means further includes:
a seventh amplifier having first and second inputs and an output, said first input being coupled to said output of said fourth amplifier, said second input receiving said third power supply potential; and
first current supply means having an input coupled to said output of said seventh amplifier and having an output for providing a current.

5. The SLIC of claim 4 wherein said second means includes:
an eighth amplifier having first and second inputs and an output, said first input being coupled to said output of said first current supply means, said second input receiving a fourth power supply potential;
a ninth resistor coupled between said output of said eighth amplifier and said first input of said eighth amplifier;
a ninth amplifier having first and second inputs and an output, said first input being coupled to said output of said eighth amplifier;
a tenth resistor coupled between said output of said ninth amplifier and said first input of said ninth amplifier;
an eleventh resistor coupled between said output of said ninth amplifier and a second node;
a twelfth resistor coupled between said second node and said second input of said ninth amplifier; and
a thirteenth resistor coupled between said second node and the first input of the SLIC.

6. The SLIC of claim 5 wherein said second means further includes:
a tenth amplifier having first and second inputs and an output, said first input being coupled to said output of said sixth amplifier, said Second input receiving said third power supply potential; and
second current supply means having an input coupled to said output of said tenth amplifier and having an output for providing a current.

7. The SLIC of claim 6 wherein said second means further includes:
an eleventh amplifier having first and second inputs and an output, said first input being coupled to said output of said second current supply means, said second input receiving a fifth power supply potential;
a fourteenth resistor coupled between said output of said eleventh amplifier and said first input of said eleventh amplifier;
a twelfth amplifier having first and second inputs and an output, said first input being coupled to said output of said eleventh amplifier;
a fifteenth resistor coupled between said output of said twelfth amplifier and said first input of said twelfth amplifier;
a sixteenth resistor coupled between said output of said twelfth amplifier and a third node;
a seventeenth resistor coupled between said third node and said second input of said twelfth amplifier;
an eighteenth resistor coupled between said third node and the second input of the SLIC.

8. A subscriber line interface circuit (SLIC) having first and second inputs, comprising:

first means coupled to the first and second inputs of the SLIC for receiving first and second transmission signals having AC and DC signal levels, said first means sensing DC variation of said first and second transmission signals for providing a DC feedback signal, said first means including,
- (a) a first amplifier having first and second inputs and an output, said first input of said first amplifier receiving a first power supply potential,
- (b) a first resistor coupled between the first input of the SLIC and a first node,
- (c) second and third resistors serially coupled between said first node and said second input of said first amplifier, and
- (d) a fourth resistor coupled between said output of said first amplifier and said second input of said first amplifier; and second means coupled to the first and second inputs of the SLIC for providing a DC output impedance in response to said DC feedback signal, said second means including
- (e) a second amplifier having first and second inputs and an output,
- (f) a fifth resistor coupled between said output of said first amplifier and said first input of said second amplifier,
- (g) a sixth resistor coupled between said first input of said second amplifier and said first node,
- (h) a seventh resistor coupled between said first node and said output of said second amplifier, and
- (i) an eighth resistor coupled between said output of said second amplifier and said second input of said second amplifier.

9. The SLIC of claim 8 wherein said first means further includes:
- a third amplifier having first and second inputs and an output, said first input receiving a second power supply potential;
- a ninth resistor coupled between the second input of the SLIC and a second node;
- tenth and eleventh resistors serially coupled between said second node and said second input of said third amplifier; and
- a twelfth resistor coupled between said second input of said third amplifier and said output of said third amplifier.

10. The SLIC of claim 9 wherein said second means further includes:
- a fourth amplifier having first and second inputs and an output;
- a thirteenth resistor coupled between said output of said third amplifier and said first input of said fourth amplifier;
- a fourteenth resistor coupled between said first input of said fourth amplifier and said second node;
- a fifteenth resistor coupled between said second node and said output of said fourth amplifier;
- a sixteenth resistor coupled between said output of said fourth amplifier and said second input of said fourth amplifier; and
- a capacitor coupled between an interconnection of said second and third resistors and an interconnection of said tenth and eleventh resistors.

* * * * *